United States Patent
Kunjuramanpillai et al.

(10) Patent No.: US 12,032,956 B2
(45) Date of Patent: *Jul. 9, 2024

(54) TECHNIQUES TO DEPLOY AN APPLICATION AS A CLOUD COMPUTING SERVICE

(71) Applicant: Capital One Services, LLC, McLean, VA (US)

(72) Inventors: Anoop Kunjuramanpillai, McKinney, TX (US); Phani Krishna Hari, The Colony, TX (US); Radford Shiozaki, Frisco, TX (US); Baswaraj Thota, Frisco, TX (US); Kenneth Naugle, Carrollton, TX (US); David Schaaf, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,985

(22) Filed: Jan. 21, 2022

(65) Prior Publication Data

US 2022/0222070 A1 Jul. 14, 2022

Related U.S. Application Data

(63) Continuation of application No. 16/822,668, filed on Mar. 18, 2020, now Pat. No. 11,263,005, which is a (Continued)

(51) Int. Cl.
*G06F 8/76* (2018.01)
*G06F 8/41* (2018.01)
(Continued)

(52) U.S. Cl.
CPC ............... *G06F 8/76* (2013.01); *G06F 8/433* (2013.01); *G06F 8/63* (2013.01); *G06F 8/75* (2013.01); *G06F 8/77* (2013.01); *G06N 20/00* (2019.01)

(58) Field of Classification Search
CPC ........ G06F 8/433; G06F 8/63; G06F 8/75–77; G06N 20/00
See application file for complete search history.

(56) References Cited

U.S. PATENT DOCUMENTS 9,436,585 B1 * 9/2016 Bak ............................ G06F 8/71
10,007,515 B2 * 6/2018 Subramanian ............ G06F 8/76
(Continued)

*Primary Examiner* — S. Sough
*Assistant Examiner* — Zheng Wei
(74) *Attorney, Agent, or Firm* — KDW Firm PLLC

(57) ABSTRACT

Techniques are described to automate deployment of an application as a cloud computing service. Such deployment may be accomplished on any underlying host infrastructure. As mentioned above, a typical application may engage in a number of build and deployment processes in order to run on a host computer with an infrastructure type. The techniques described herein may leverage an artificial intelligence computation library to identify which build and deployment processes are required by the application. Once identified, the user may select a host infrastructure type and create a container package with a runtime machine and components configure to run these build and deployment processes for that host infrastructure type. The container package may be used to generate an image from which the host computer can run the application as the cloud computing service. Other embodiments are described and claimed.

20 Claims, 8 Drawing Sheets

Related U.S. Application Data continuation of application No. 16/394,513, filed on Apr. 25, 2019, now Pat. No. 10,635,437.

(51) Int. Cl.
  *G06F 8/61* (2018.01)
  *G06F 8/75* (2018.01)
  *G06F 8/77* (2018.01)
  *G06N 20/00* (2019.01)

(56) References Cited

U.S. PATENT DOCUMENTS

| | | | |
|---|---|---|---|
| 10,120,670 B1* | 11/2018 | Atkinson | G06F 8/71 |
| 2013/0315492 A1* | 11/2013 | Gimpl | G06F 8/63 |
| | | | 382/232 |
| 2016/0216948 A1* | 7/2016 | McPherson | G06F 8/36 |
| 2017/0249127 A1* | 8/2017 | Parees | G06F 8/71 |
| 2018/0196658 A1* | 7/2018 | Borley | G06F 8/76 |
| 2020/0125344 A1* | 4/2020 | Varghese | G06F 8/37 |
| 2020/0125352 A1* | 4/2020 | Kannan | G06F 8/65 |
| 2020/0233403 A1* | 7/2020 | Gelbke | G06F 8/65 |

* cited by examiner

500

CREATE A STRATEGY MODEL AND DETERMINE A BUILD PIPELINE AND A DEPLOYMENT PATTERN FOR AN APPLICATION
502

CREATE A CONTAINER PACKAGE FROM THE BUILD PIPELINE AND THE DEPLOYMENT PATTERN
504

GENERATE AN IMAGE FROM THE CONTAINER PACKAGE
506

RUN THE APPLICATION AS A CLOUD COMPUTING SERVICE
508

PRESENT, VIA A USER INTERFACE, DATA CORRESPONDING TO RUNNING THE APPLICATION AS THE CLOUD COMPUTING SERVICE
510

```
PROCESS INTERACTION WITH A GUI ELEMENT TO EXECUTE
LOGIC FOR RUNNING AN APPLICATION AS A CLOUD
COMPUTING SERVICE
602

GENERATE CLONES OF AN APPLICATION TO BE RUN AS A
PLURALITY OF CLOUD COMPUTING SERVICES
604

PROCESS LOG DATA ASSOCIATED WITH RUNNING AN
APPLICATION AS A CLOUD COMPUTING SERVICE
606

UPDATE AN IMAGE WITH A PATCH AND COMMUNICATE THE
UPDATED IMAGE TO IMAGE STORAGE
608
```

*FIG. 6*

TECHNIQUES TO DEPLOY AN APPLICATION AS A CLOUD COMPUTING SERVICE

RELATED APPLICATIONS

This application is a continuation of U.S. patent application Ser. No. 16/822,668 (now U.S. Pat. No. 11,263,005), filed on Mar. 18, 2020, which is a continuation of U.S. patent application Ser. No. 16/394,513 (now U.S. Pat. No. 10,635,437), filed on Apr. 25, 2019, both applications titled "TECHNIQUES TO DEPLOY AN APPLICATION AS A CLOUD COMPUTING SERVICE". The contents of the aforementioned applications are incorporated herein by reference in their entireties.

BACKGROUND

An application development team experiences pain points whenever deploying their applications in a cloud environment. Every application deployment team needs to make sure that they comply with different company security policies, infrastructure maintenance policies, cloud control policies, and/or the like. It is highly critical that the application development team adheres to the company policies to protect critical company data and ensure security of host infrastructure. A typical application deployment needs static analysis, unit testing, module testing, functional testing, performance testing, security testing, open source scan, and/or additional tests, and it has become tedious for application developer teams to implement build pipelines that facilitates all of these tests. The typical application in a cloud environment is additionally tedious, requiring a number of checkpoints, configuration considerations, enterprise policy requirements, and/or the like. There may not be a one-size fits all deployment plan. For instances where a number of teams with differing needs are deploying applications to a cloud environment, many resources may be wasted in these individual efforts to deploy their applications. To conserve resources, there is a need for a tool to facilitate cloud deployment that can abstract away enterprise requirements and understand application specific needs so as to be usable by disparate teams for deploying their unique applications in a cloud environment. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to deploy an application as a cloud computing service. In one embodiment, for example, an apparatus may comprise computer memory, processing circuit, and logic operative on the processing circuit to create a strategy model corresponding to a build and deployment of computer code comprising an application and determine a build pipeline and a deployment pattern based on the strategy model. The logic is further operative to create a container package from the build pipeline and the deployment pattern wherein the container package comprises a runtime machine and information identifying commands and components to assemble an image for running the application. The logic is further operative to generate the image using the container package. The logic is further operative to run the application as a cloud computing service on a host computer by providing the host computer with access to the image. The logic is further operative to present, via a user interface, data corresponding to running the application as the cloud computing service. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

FIG. 6 illustrates an embodiment of a logic flow for the user interface for the system of FIG. 1.

DETAILED DESCRIPTION

Figure 1:
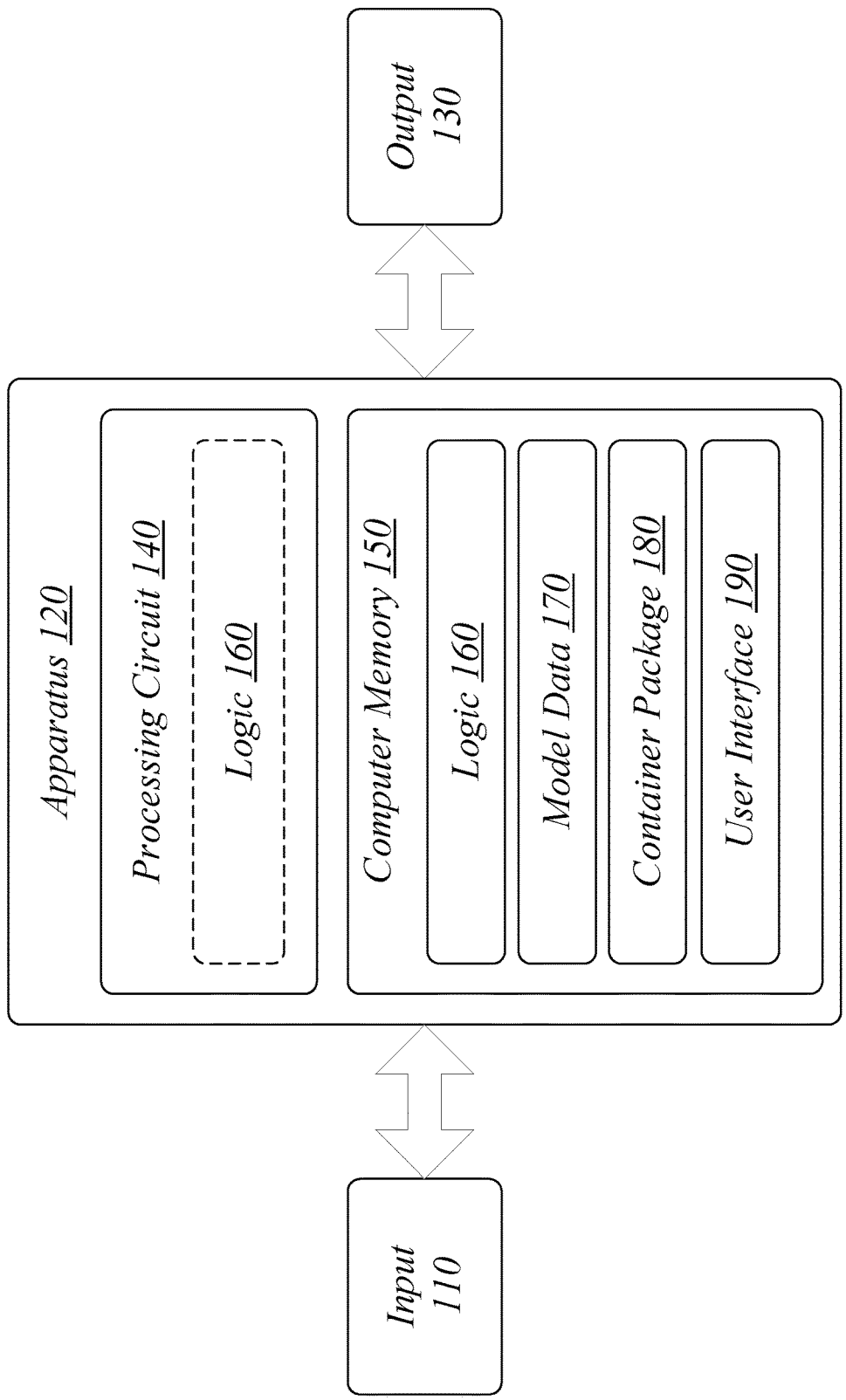
FIG. 1 illustrates an embodiment of a system to deploy an application as a cloud computing service on any underlying host infrastructure.

Various embodiments are directed to deploying an application as a cloud computing service. Such deployment may be automatically configured with minimal or no human intervention. Some of the various embodiments described herein eliminate human intervention while ensuring a successful build and deployment of the application's computer code onto a host computer regardless of the host computer's infrastructure. The various embodiments leverage container package technology to provide the host computer with a runtime machine as well as components and information to properly run the application as a cloud computing service via the runtime machine and the components. The various embodiments apply a machine learning technique to determine the components and the information to properly run the application.

It is appreciated that the machine learning technique is applicable because applications—even ones written in different languages—have similar build and deployment processes. Multiple applications, for example, may need static analysis, unit testing, module testing, functional testing, performance testing, security testing, open source scan, and/or like. A strategy model built by the machine learning technique identifies a set of attributes for executing, at runtime, these build and deployment processes. As described further below, a container package may include a runtime machine with necessary components and information for executing these build and deployment processes.

Some embodiments are particularly directed to techniques to deploy the application as a cloud computing service for operation on any underlying host infrastructure. These embodiments rely on an image and that image's accompanying files to run the application as the cloud computing service. Under this design, these embodiments configure an application programming interface (API) with function calls executing commands to assemble the image and the image's accompanying files. These commands follow a machine learning model with respect to building and deploying computer code to run the application. Via a Graphical User Interface (GUI), the process for assembling the image can be initiated through the activation of a GUI element on that interface. For example, by selecting (e.g., via touch) a button on the GUI, embodiments of the present disclosure execute the above-mentioned techniques and automatically create the image for running the application. Hence, running the application from the resulting image is agnostic to the underlying host infrastructure. In addition, the present disclosure presents a user interface displaying data corresponding to running the application.

The development of applications is no longer hindered by the processes involved in deploying applications as resources. A portion of the present disclosure depicts a user interface with a process whereby computer code is submitted, analyzed for a build pipeline and deployment pattern, and then automatically deployed as a cloud computing service. Applications, while still available for use on a single device, are being offered to customers via the Internet as cloud computing services. Instead of installing an application on a computer using a physical copy of that application's computer code, the techniques described herein allow for the efficient build and deployment of applications as cloud computing services.

The various embodiments include an apparatus, a method, and a computer-readable medium operative to create a strategy model corresponding to a build and deployment of computer code comprising an application, determine a build pipeline and a deployment pattern based on the strategy model, create a container package from the build pipeline and the deployment pattern wherein the container package comprises a runtime machine and information identifying commands and components to assemble an image for running the application, generate the image using the container package, run the application as a cloud computing service on a host computer by providing the host computer with access to the image, and present, via a user interface, data corresponding to running the application as the cloud computing service. As a result, the embodiments can improve affordability, scalability, modularity, extendibility, or interoperability for an operator, device or network.

With general reference to notations and nomenclature used herein, the detailed descriptions which follow may be presented regarding program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having an apparatus 120 comprising one or more components. Although the system 100 shown in FIG. 1 has a limited number of elements in a certain topology, it may be appreciated that the system 100 may include more or less elements in alternate topologies as desired for a given implementation.

FIG. 1 depicts the system 100 as including input 110 and output 130 for the apparatus 120 to process and communicate, respectively. The apparatus 120 includes a processing circuit 140 (or processing circuitry comprising more than one processing circuit 140) and computer memory 150, possibly, in a configuration of one or more memory units.

The apparatus 120 may be generally arranged to execute, on the processing circuit 140, the logic 160 that is being stored in the computer memory 150. As described herein, when executed and in operation on the processing circuit 140, the logic 160 may be generally arranged to cause the processing circuit 140 create model data 170 including a strategy model corresponding to a build and deployment of computer code comprising an application. The logic 160 may be further configured to determine a build pipeline and a deployment pattern based on the strategy model in the model data 170 and create a container package 180 from the build pipeline and the deployment pattern wherein the container package comprises a runtime machine and information identifying commands and components to assemble an image for running the application. The logic 160 may be further configured to generate the image using the container package 180, run the application as a cloud computing service on a host computer by providing the host computer with access to the image (e.g., in an image repository), and present, via a user interface 190, data corresponding to running the application as the cloud computing service.

The model data 170 generally refers to one or more machine learning models which are statistical and mathematical models having multiple purposes, such as descriptive, predictive, and prescriptive analytics. Creating the machine learning model requires the logic 160 to execute a machine learning technique on training data. The present disclosure intends for the training data to include any data point related to the build and deployment of an application (including testing).

In some embodiments, the logic 160 employs a dataflow programming interface, such as an open-source computational library—a symbolic math library, such as GOOGLE® TensorFlow™—for machine learning applications. By leveraging such a computational library, the logic 160 is able to build machine learning constructs and apply machine learning techniques to identify patterns or correlations in the training data for mapping attributes corresponding to application build and deployment to a certain build pipeline and deployment pattern. The mapped attributes for the build pipeline and/or deployment pattern may be optimal or near-optimal for operating the application in any underlying infrastructure. Alternatively, the mapped attributes for the build pipeline and/or deployment pattern could be suboptimal. Some mapped attributes identify common or similar build and deployment processes, for example, static analysis, unit testing, module testing, functional testing, performance testing, security testing, open source scan, and/or like. In any configuration, the machine learning model in the model data 170 captures the mapped attributes and then, stores the mapped attributes into the container package 180 as information identifying components and commands to assemble an image for running the application as a cloud computing service. In some embodiments, the model data 170 captures a set of attributes for each host infrastructure type.

The container package 180 generally refers to a logical unit comprising a runtime machine and information identifying commands and components to assemble an image for running the application as a cloud computing service on any underlying host infrastructure. The runtime machine (which also may be referred to as a runtime image or base image) includes code components necessary to execute the application's computer code and operate the application. When combined, the runtime machine and the application's computer code form the complete image for running the application as a cloud computing service on any underlying infrastructure. Hence, the host computer may have any hardware/software configuration but, via the container package, may still run the application as a cloud computing service.

The user interface 190 generally refers to a component for generating a graphical user interface (GUI) with a background and elements to be displayed as the output 130 on a display device.

Figure 2:
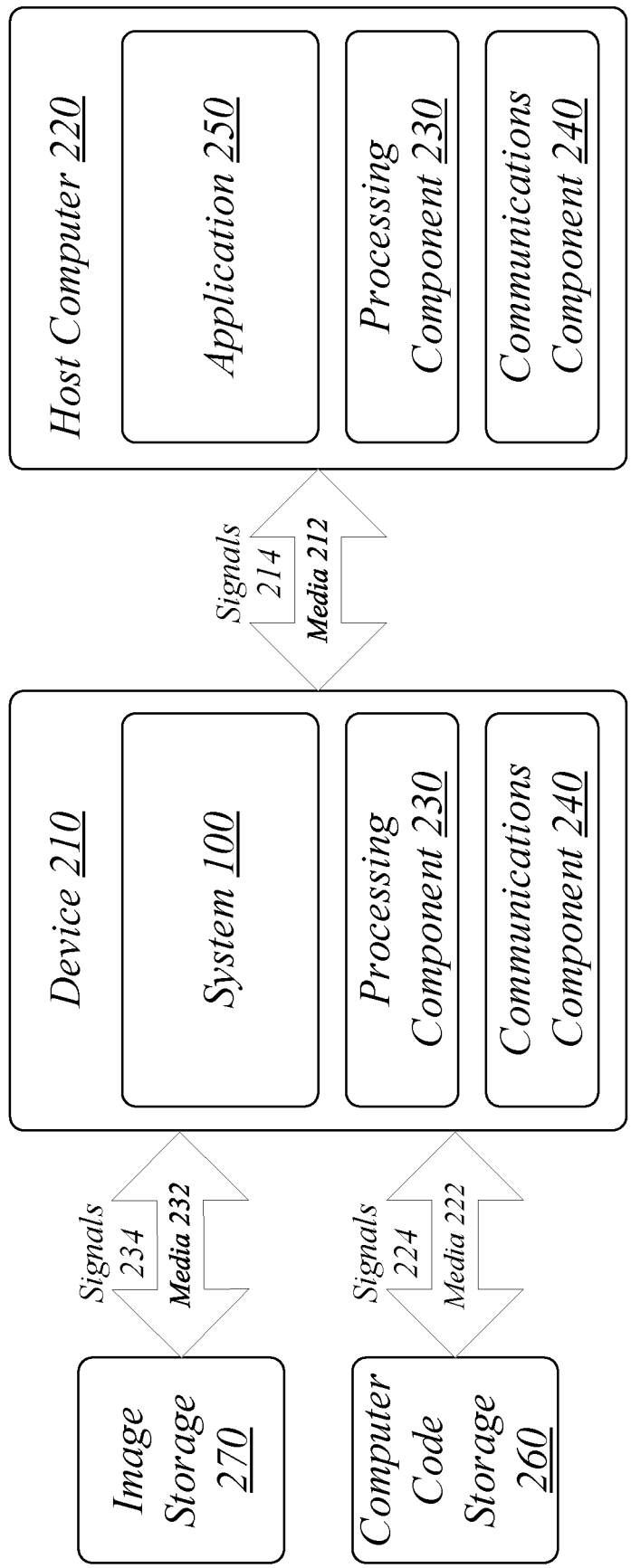
FIG. 2 illustrates an embodiment of a distributed system for the system of FIG. 1.

FIG. 2 illustrates a block diagram of a distributed system 200. The distributed system 200 may distribute portions of the structure and/or operations for the system 100 across multiple computing entities. Examples of distributed system 200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 200 may comprise an electronic client device 210 and a host computer 220 to operate as a host server for a cloud computing service. In general, the device 210 and the host computer 220 may be the same or similar to the apparatus 120 as described with reference to FIG. 1. In one example, the device 210 and the host computer 220 may communicate over a communications media 212 using communications signals 214 via a communications component 240.

The device 210 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 210 may execute processing operations or logic for the system 100 using a processing component 230. The processing component 230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 210 may execute communications operations or logic for the system 100 using the communications component 240. The communications component 240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 212, 224, 234 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In yet another example, the device 210 and/or the host computer 220 may cooperate to build, deploy, and operate an application 250 using the processing component 230 and the communications component 240. The distributed system 200 may implement various storage technologies to support the build, deployment, and operation of the application 250. One example implementation of the distributed system 200 includes a plurality of storage units coupled to the device 210 and/or the host computer 220. In one example, the device 210 may communicate over communications media 222, 232 using communications signals 224, 234 with computer code storage 260 and an image storage 270, respectively.

The computer code storage 260 generally refers to networked storage infrastructure for storing code packages on a computer network, such as the Internet. Some of the code packages are submitted via the Internet. The computer code storage 260 can be accessed via a network address (e.g., a URL). In general, the computer code storage 260 stores (one or more versions of) computer code for the application 250.

The image storage 270 generally refers to storage infrastructure for storing images. When accessed and mounted by an appropriate hardware/software mechanism, an image commences and controls the running of the application 250 as the cloud computing service. One example implementation of the image storage 270 is a DOCKER® Image repository where DOCKER® Images are stored; this repository is different and separate from an image registry, which is a collection of pointers to the DOCKER® Images. Images in the DOCKER® Image repository can be designed as open to the public or private.

The device 210 may comprise or employ logic (e.g., one or more client programs that operate) to perform various methodologies in accordance with the described embodiments. In one embodiment, for example, the device 210 may implement logic to deploy the application 250 as the cloud computing service on the host computer 220. The processing component 230 executes the logic in the device 210 to employ an artificial intelligence computational library to analyze the computer code of the application 250 to identify dependencies (e.g., plug-ins, components, jobs, and/or the like) as well as a strategy for build and deployment the application 250. A portion of the strategy refers to a pipeline or sequence of operations that when performed correctly and in order, the application 250 is properly built. If one job in the pipeline fails, the entire build process fails. Another portion of the strategy refers to the pattern of operations that properly deploy the application 250 as a service. Similarly, if one job fails, the entire deployment process fails. For example, if testing reveals flaws, the application 250 cannot be properly deployed.

The logic in the device 210 may create a container package for the application 250 by combining a runtime machine, the computer code for the application 250, and a document describing components and/or commands to assemble the image for running the application 250. As the logic in the device 210 identifies the appropriate build pipeline and deployment pattern, the logic ensures that the components corresponding to the appropriate build pipeline and deployment pattern are available and includes them into the container package.

The container package may be stored until the cloud computing service is desired. To generate the image for running the application as the cloud computing service, the logic in the device 210 reads the document in the container package and executes each instruction. In some embodiments, the logic in the device 210 generates clones for running a plurality of cloud computing services from one image.

The host computer 220 may comprise or employ one or more server programs that operate to perform various methodologies in accordance with the described embodiments. The host computer 220 may communicate with other devices similar to the device 210 over a communications media using communications signals via the communications component 240. The other devices may be internal or external to the distributed system as desired for a given implementation.

In one embodiment, the host computer 220 may implement technology to access, in the image storage 270, the image for running the application 250 as the cloud computing service. When mounted, the host computer 220 assigns the application 250 a network address and commences execution of the computer code for the application 250. The host computer 250 operates the running application 250 as the cloud computing service for outside computing devices. For an outside computing device to interact with the application 250, the outside computing device communicates data to the above network address to access functionality offered by the cloud computer service.

Figure 3:
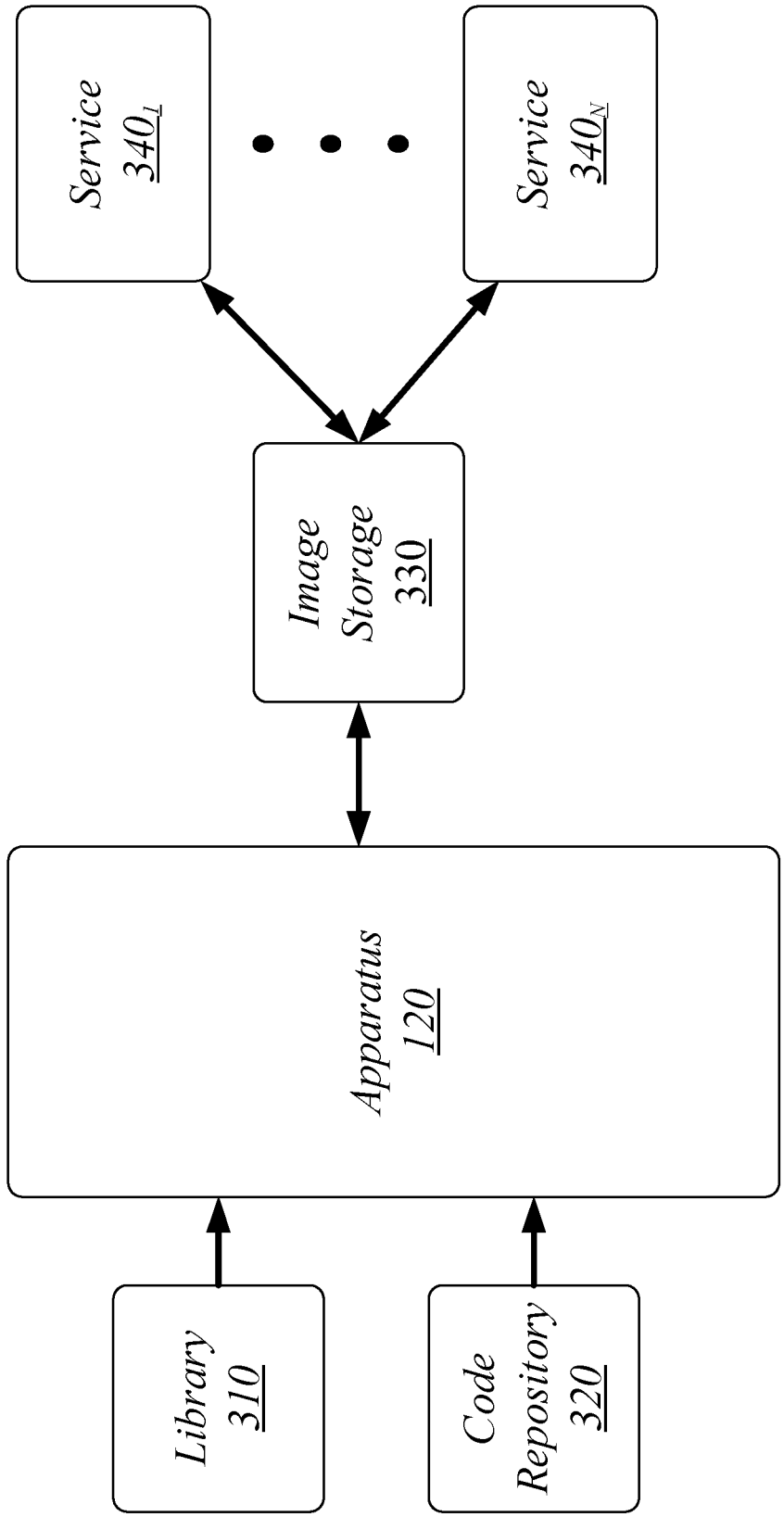
FIG. 3 illustrates an embodiment of an operating environment for the system of FIG. 1.

FIG. 3 illustrates an embodiment of an operating environment 300 for the system 100. As shown in FIG. 3, the apparatus (e.g., the apparatus 120) resides between the external logical units and a host computer for running an application as one or more cloud computer services. The apparatus 120 may further incorporate a computational library 310 of which each function call performs a certain computational technique on the application's computer code, which is being stored in a code repository 320, one example storage unit. The apparatus 120 also communicates with another storage unit—a repository comprising a set of images 330. The apparatus 120 communicates with the host computer, for example, to provide a network address associated with an image in the images 330. Via the network address, the host computer may locate and access the image to mount and run the application as a cloud computing service $340_i$ amongst a plurality of cloud computing services 340 (illustrated as $340_1 \ldots 304_N$).

In one example embodiment, the application computer code being stored in the code repository 320 (e.g., GITHUB® Enterprise Cloud™) utilizes that code repository's technology for version control and tracking. The library 310 may employ an artificial intelligence computational library (e.g., TENSORFLOW®) to implement various machine learning constructs. The apparatus 120 instructs the library 310 to process a latest version of the application's computer code, identify characteristics of the latest version of the applicant's computer code, and determine a build pipeline and deployment pattern, ensuring a proper build and a correctly running cloud computing service. The library 310 employs a number of artificial intelligence computational modules to determine which components and commands are required for the proper build and deployment of the application. The build pipeline and the deployment pattern of the running cloud computing service can be adapted to suit any organization's security policies, infrastructure maintenance policies, cloud control policies, and/or the like.

The apparatus 120, in one embodiment, utilizes various technologies (e.g., the DOCKER® enterprise-grade container platform product and related services) to generate a container package that includes a runtime machine and information on components and commands necessary to assemble an image for running the application as a cloud computing service. The apparatus 120 prepares the image for storage in the image storage 330. The container package (as described herein) may include a container (e.g., a DOCKER® container) that combines, into the full image of at least one deployment artifact, the runtime machine as a base image and the application's computer code as another layer. The command line calls include function calls to generate the image for running the application as the cloud computing service and then, interact with the running service by communicating instructions and processing feedback.

Figure 4:
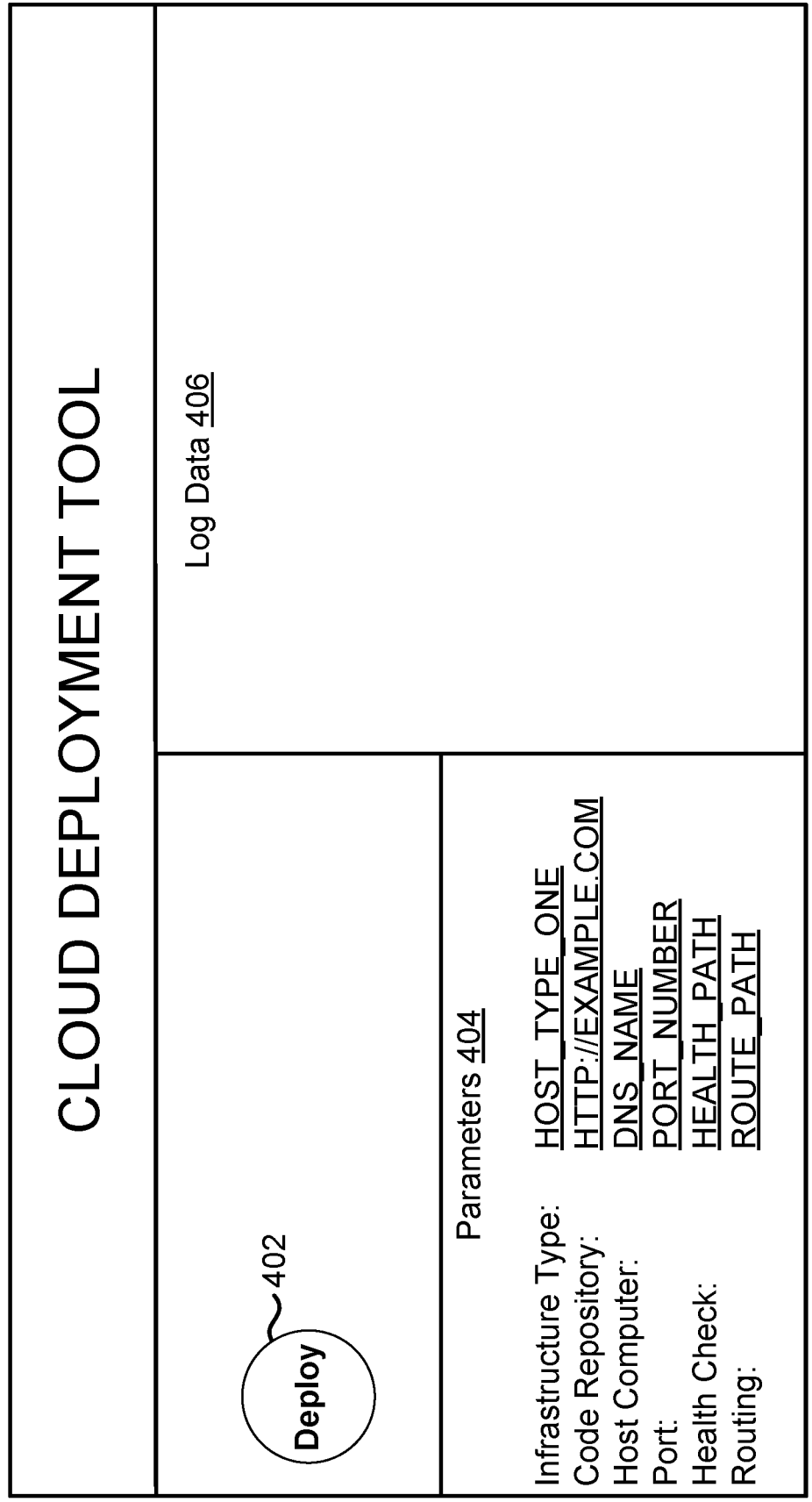
FIG. 4 illustrates an embodiment of a user interface for an apparatus in the system of FIG. 1.

FIG. 4 illustrates an embodiment of an example user interface 400 for the system 100. As shown in FIG. 4, a view of the user interface 400, in general, presents various information on a display device (e.g., a computer screen). The user interface 400 operating with a cloud deployment tool presents, on the display displace, data corresponding to an application's operations, including data corresponding to running the application as a cloud computing service.

FIG. 4 depicts the view of the user interface 400 into sub-divisions. A first sub-division located at the top left of the user interface 400 include a graphical user interface (GUI) element 402; the activation of which causes execution of logic (e.g., the logic 160 of FIG. 1) to deploy an application as a cloud computing service on any host infrastructure. In some embodiments, the execution of such logic causes circuitry (e.g., the processing circuit 140 of FIG. 1) to generate an image suitable for building and deploying the application in accordance with a set of parameters 404. The resulting image includes a set of compatible components and information directing a host computer on deploying and ultimately running the application as a cloud computing service.

One example implementation of the user interface 400 depicts the GUI element 402 as a user interface button with text "Deploy" included. It is appreciated that a number of ways can accomplish the activation of the GUI element 402, such as via selection by a pointing device or a touch on a touchscreen. If the user interface 400 is operable with a natural user interface (NUI), activation of the GUI element 402 may be completed via gesture and/or speech.

The user interface 400 depicts, in a second sub-division below the first sub-division, the set of parameters 404 associated with configuring the build and deployment of an application. As depicted in FIG. 4, some parameters 404 include an infrastructure type, a code repository, a host computer, a port, a health check, and routing. FIG. 4 illustrates examples of the parameters 404, including HOST_TYPE_ONE (e.g., AMAZON® Elastic Container Service® (ECS)) for the infrastructure type and HTTP://EXAMPLE.COM as an Internet link/address (e.g., a Uniform Resource Locator (URL)) to the code repository (e.g., GITHUB®). FIG. 4 further illustrates, as examples, a host name for the host computer, DNS_NAME; a port, PORT_NUMBER; a path for the health check, HEALTH_PATH; and a path for routing, ROUTE_PATH. The host name for the host computer, DNS_NAME, resolves to a network address, such as an IP address. Some example implementations may use a URL for DNS_NAME.

The host computer, as described herein, includes components operative to mount an image and run the application as a cloud computing service. With the DNS_NAME, the cloud computing service is associated with the host computer and available to process service requests from client computers.

The user interface 400 depicts, in another sub-division to the right of the above two above-mentioned sub-divisions, log data 406 describing various operations corresponding to the application. These operations may refer to operations carried out before the application is run as a cloud computing service, such the build and deployment of the cloud computing service as determined by a strategy model. These operations also refer to operations carried out while running of the application as a cloud computing service, including any input into and/or output out of the cloud computing service. The log data 406 describes instructions executed by the cloud computing service of which some initiate the above operations. The log data 406 may include data describing results from the executed instructions. In some embodiments, the sub-division for the log data 406 displays the results data as delineated entries (i.e., according to time-order).

Included herein is a set of flow charts representative of exemplary methodologies for performing exemplary aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

A user may activate the logic flow 500 in a number of ways. As described herein, a GUI resembling the user interface 400 of FIG. 4 includes GUI elements that correspond to processor-executable instructions (e.g., the logic 160 of FIG. 1) operable to deploy an application as a cloud computing service. Some of these processor-executable instructions are represented by the logic flow 500. The user may access a portal to the GUI, insert parameter data for an image, and initiate a GUI element configured to activate the logic flow 500. One example parameter is a resource locator such as a URL or another network address (in a hyperlink) corresponding to the application's location in a code repository. Another example parameter specifies a host infrastructure type such as HOST_TYPE_ONE (e.g., AMAZON® Elastic Container Service® (ECS)).

In the illustrated embodiment shown in FIG. 5, the logic flow 500 creates a strategy model and determines a build pipeline and deployment pattern for an application at block 502. The logic flow 500 may use the strategy model and the parameter data to determine the appropriate build and deployment pattern for the user's desired host infrastructure type. Computer code comprising the application may execute properly only under certain conditions and once those conditions are met, may then operate correctly only if additional conditions are met. In addition to an organization's security policies, infrastructure maintenance policies, cloud control, and/or the like—of which the application must be in compliance—the application has dependencies necessary for and requires certain components for the proper build and/or deployment. Information describing potential conditions, dependences, components and/or the like may be stored in the strategy model. Based upon such information, the logic flow 500 identifies which conditions, dependences, components and/or the like most likely result in a proper build and/or deployment. In some embodiments, the logic flow 500 determines an optimal or near-optimal build pipeline and deployment pattern.

The logic flow 500 may create a container package from the build pipeline and the deployment pattern at block 504. The container package, in general, includes instructions sufficient to assemble an image from which a host computer runs an application as a cloud computing service. Generally, the image is an executable package that includes almost everything needed to run the application, including the computer code, a runtime machine, libraries, environment variables, and configuration files. The logic flow 500 further launces a container by running the image. The container is a runtime instance of the image, which in general represents what the image becomes in computer memory when mounted and instantiated. The instructions sufficient to assemble the image represent at least part of the determined build pipeline and deployment pattern and specify the conditions, dependences, and components to effectuate the application as a cloud computing service.

Container technologies (e.g., DOCKER® Enterprise Container Platform™, AMAZON® Elastic Container Service™ (ECS) and/or the like) provide a mechanism to run applications (with all its dependencies, plug-ins, and libraries) securely and isolated within a container package. The container technologies can build images automatically by reading the instructions from a document known as a DOCKER® file. This document includes at least all of the commands that could be entered into the command line to assemble the image. Using the document, the container technologies can create an automated build that executes several command-line instructions in succession. Example container technologies are each configured to access the container packager, generate the image, and then, run the application as a cloud computing service as described herein.

The logic flow 500 may generate an image from the container package at block 506. In some embodiments, the container package comprises command-line commands (in order) to access a runtime machine as a base image, build a full image combining the application's computer code and the runtime machine as the base image. Some or all of the conditions, dependencies, and components may be stored in the runtime machine or in another portion of the container package. For example, the logic flow 500 can build images automatically by reading instructions from the above-mentioned document in the container package and executing several command-line instructions in succession. The above-mentioned document may be a text document that contains all the commands that could be called on a command line to assemble the image. Once built, the generated image is stored in a separate repository or storage facility.

The logic flow 500 may run the application as a cloud computing service at block 508. Even when stored in the separate repository, the device 210 and/or the image repository may configure the image with information, such as a specific network address (including port number), rendering the generated image accessible by any host computer. Once the generated image is accessed and mounted, the host computer runs the application as an Internet application open to input/output with other networked users. For example, the host computer may operate AMAZON® Elastic Container Service® (ECS) and when the container package is deployed over ECS®, the application is run as an ECS® cloud computing service.

The logic flow 500 may present, via a user interface, data corresponding to running the application as the cloud computing service at block 510. For example, the cloud computing service may produce log data (e.g., the log data 406 of FIG. 4) describing executed operations in time-order. The cloud computing service may also serve client devices by producing results data in response to instructions (e.g., queries, commands, requests, and/or the like). The embodiments are not limited to this example.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 processes interaction with a GUI element to execute logic (e.g., the logic 160 of FIG. 1) for running an application as a cloud computing service at block 602. The GUI element may be presented on a user interface resembling the user interface 400 of FIG. 4.

The logic flow 600 may generate clones of an application to be run as a plurality of cloud computing services at block 604. As described herein, the user interface 400 accepts parameter data for a build and deployment of the application on a particular host infrastructure. As reflected by the parameter data, each organization defines their own specific set of the organization's security policies, infrastructure maintenance policies, cloud control, and a clone can be configured according to a particular recipient organization's requirement. Each clone is a host computer compatible with the host infrastructure type and, via an image generated from a container package using techniques described herein, configured with a same set of conditions, dependences, and/or components to run the application as a cloud computing service.

Computer code for the application may be housed in a code repository. In some embodiments, the logic flow 600, leveraging an artificial intelligence computational library (e.g., GOOGLE TensorFlow), captures a strategy model corresponding to a build and deployment of the computer code on any host infrastructure type. Based upon the parameter data, the strategy model indicates a set of attributes directing the appropriate build pipeline and the deployment pattern. The logic flow 600 is further configured to create the container package from the appropriate build pipeline and the deployment pattern. The container package includes a runtime machine and information identifying commands and components to assemble the image for running the application on the clones as the cloud computing service.

The logic flow 600 is further operative to present, via the user interface, data corresponding to running the application as the cloud computing service. The logic flow 600 may process log data associated with running the application as the plurality of cloud computing services at block 606. For example, as each clone is running, each clone logs data describing that clone's operations and status changes. For example, when the user activates the GUI element (e.g., the GUI element 402 of FIG. 4), log data is generated referring to a health check procedure initiated for at least one clone (host computer) to ensure that is suitable to run the application. In some embodiments, the logic 160 of the apparatus 120 of FIG. 1 performs the health check procedure. As described herein, the health check procedure is an example parameter for running the application as a cloud computer service. The log data describes a current build and deployment of the application, as dictated by a strategy model. By way of the log data, the user interface allows for the user to view details regarding the cloud computing service. By viewing the log data, the user may determine whether the current build and deployment strategy for the application is appropriate.

The logic flow 600 may update the image with a patch and communicate the updated patch to the code repository at block 608. The logic flow 600 may engage in a number of rehydration processes, and one example rehydration process may involve patching the application's computer code in the code repository and have that change propagate to the clones running the application as the cloud computing service. The patch may be used to correct a fault in the application's computer code. Alternatively, the patch may be used to upgrade an existing feature or install a new feature to the application's computer code. After modifying the application's computer code, the logic flow 600 may modify the container package by selecting new or replacement components, changing the runtime machine, and/or modifying/adding function calls to assemble the image. Once modified, the clones may migrate to the runtime machines corresponding to the patched applications. The embodiments are not limited to this example.

Figure 7:
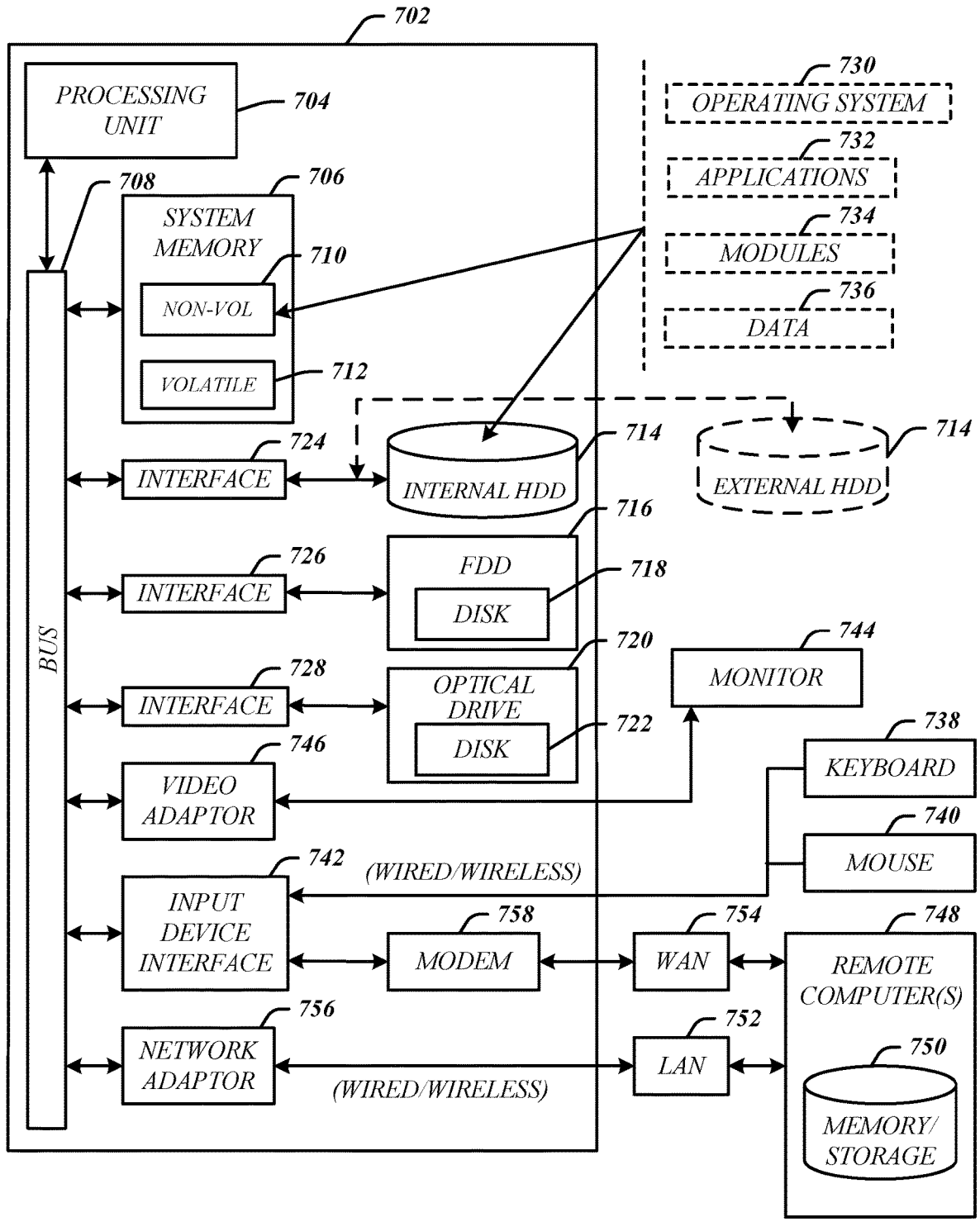
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multicore processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
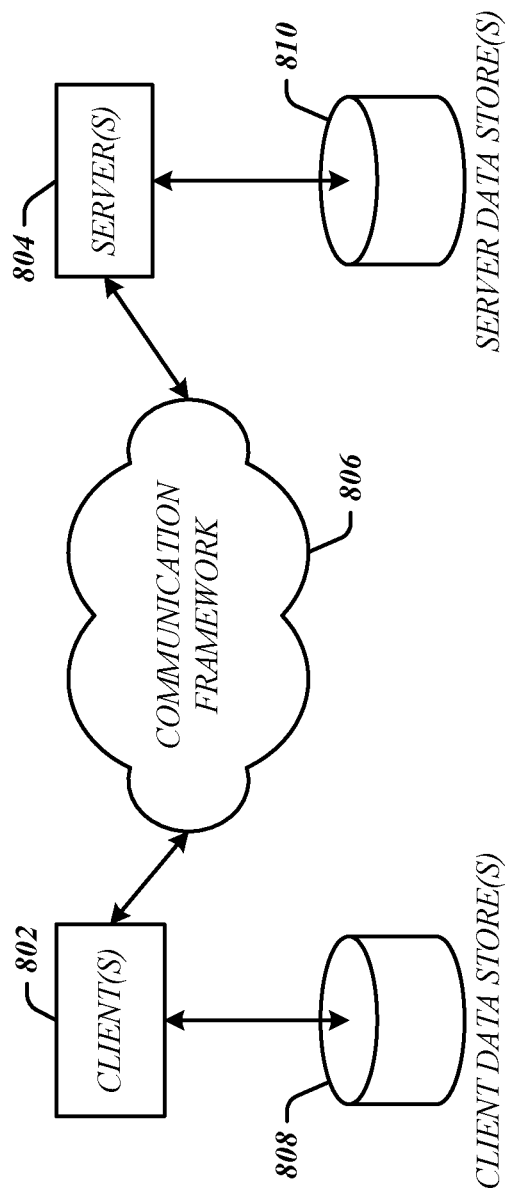
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 210. The servers 804 may implement the server device 950. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
processing an interaction with a graphical user interface (GUI) element to deploy an application in a cloud-based computing platform as a cloud computing service;
accessing a strategy model corresponding to a build and deployment of computer code for a plurality of host infrastructure types;
determining, based on the strategy model, a build pipeline and deployment pattern to run on a host computer that corresponds to a build pipeline and deployment pattern associated with a host infrastructure type selected from the plurality of host infrastructure types by a user of the host computer;
generating, from the determined build pipeline and deployment pattern, a container package from computer code associated with the application in a code repository, wherein the container package comprises a runtime machine and information identifying commands and components to generate an image for the application;
generating the image from the container package;
deploying clones of the image in the cloud-based computing platform based on the determined deployment pattern, each clone of the image enabled to execute in the cloud-based computing platform;
determining a patch to update the image; and
propagating the patch to each clone of the image.

2. The computer-implemented method of claim 1, comprising: applying the patch to the computer code or the container package associated with the application in the code repository; and updating the image and the clones based on the patch applied to the computer code associated with the application.

3. The computer-implemented method of claim 2, wherein applying the patch comprises modifying the computer code associated with the application.

4. The computer-implemented method of claim 2, wherein applying the patch comprises modifying the container package with new or replacement components, changing the runtime machine, modifying or adding function calls, or a combination thereof.

5. The computer-implemented method of claim 2, comprising redeploying the clones to propagate the patch to each clone of the image.

6. The computer-implemented method of claim 1, wherein the patch is to fix a fault in the computer code associated with the application.

7. The computer-implemented method of claim 1, wherein the patch is to upgrade an existing feature of the computer code associated with the application.

8. The computer-implemented method of claim 1, wherein the patch is to install a new feature in the computer code associated with the application.

9. An apparatus, comprising:
    computer memory;
    a processing circuit; and
    logic stored in the computer memory and operative on the processing circuit, the logic to cause the processing circuit to:
        receive an indication to deploy an application in a cloud-based computing platform as a cloud computing service based on an interaction with a graphical user interface (GUI) element;
        access a strategy model corresponding to a build and deployment of computer code for a plurality of host infrastructure types;
        determine, based on the strategy model, a build pipeline and deployment pattern to run on a host computer that corresponds to a build pipeline and deployment pattern associated with a host infrastructure type selected from the plurality of host infrastructure types by a user of the host computer;
        generate, from the determined build pipeline and deployment pattern, a container package from computer code associated with the application in a code repository, wherein the container package comprises a runtime machine and information identifying commands and components to generate an image for the application;
        generate the image from the container package;
        deploy clones of the image in the cloud-based computing platform based on the determined deployment pattern, each clone of the image enabled to execute in the cloud-based computing platform;
        determine a patch to update the image; and
        propagate the patch to each clone of the image.

10. The apparatus of claim 9, further comprising logic to cause the processing circuit to: apply the patch to the computer code associated with the application or the container package associated with the application in the code repository; and update the image and the clones based on the patch applied to the computer code associated with the application.

11. The apparatus of claim 10, wherein applying the patch comprises modifying the computer code associated with the application.

12. The apparatus of claim 10, wherein applying the patch comprises modifying the container package with new or replacement components, changing the runtime machine, modifying or adding function calls, or a combination thereof.

13. The apparatus of claim 10, further comprising logic to cause the processing circuit to redeploy the clones to propagate the patch to each clone of the image.

14. The apparatus of claim 9, wherein the patch is to fix a fault in the computer code of the application.

15. The apparatus of claim 9, wherein the patch is to upgrade an existing feature of the computer code of the application.

16. The apparatus of claim 9, wherein the patch is to install a new feature in the computer code of the application.

17. At least one non-transitory computer-readable storage medium comprising instructions that, when executed, cause a system to:
    receive an indication to deploy an application in a cloud-based computing platform as a cloud computing service based on an interaction with a graphical user interface (GUI) element;
    access a strategy model corresponding to a build and deployment of computer code for a plurality of host infrastructure types;
    determine, based on the strategy model, a build pipeline and deployment pattern to run on a host computer that corresponds to a build pipeline and deployment pattern associated with a host infrastructure type selected from the plurality of host infrastructure types by a user of the host computer;
    generate, from the determined build pipeline and deployment pattern, a container package from computer code associated with the application in a code repository, wherein the container package comprises a runtime machine and information identifying commands and components to generate an image for the application;
    generate the image from the container package;
    deploy clones of the image in the cloud-based computing platform based on the determined deployment pattern, each clone of the image enabled to execute in the cloud-based computing platform;
    determine a patch to update the image; and
    propagate the patch to each clone of the image.

18. The computer-readable storage medium of claim 17, comprising instructions that when executed cause the system to: apply the patch to the computer code or the container package associated with the application in the code repository; and update the image and the clones based on the patch applied to the computer code associated with the application.

19. The computer-readable storage medium of claim 18, wherein applying the patch comprises modifying the computer code associated with the application.

20. The computer-readable storage medium of claim 18, wherein applying the patch comprises modifying the container package with new or replacement components, changing the runtime machine, modifying or adding function calls, or a combination thereof.

* * * * *